Patented Oct. 1, 1946

2,408,418

UNITED STATES PATENT OFFICE 2,408,418

FRUIT TREATMENT

Arvid M. Erickson, San Jose, and John D. Ryan, Campbell, Calif., assignors to Barron-Gray Packing Company, San Jose, Calif., a corporation of California No Drawing. Application September 11, 1942, Serial No. 457,976

13 Claims. (Cl. 127—46)

This invention relates to the preparation of sweetening media from sugar-containing material. More particularly, it relates to an improved method of preparing sweetening media from fruit.

In a copending application of the present inventors, Serial No. 457,975, filed September 11, 1942, which is in part a continuation of another copending application of the present inventors, Serial No. 413,164, filed October 1, 1941, an improved method for preparing a sweetening medium from fruit, either whole or waste, is described.

It is an object of the present invention to provide a method of preparing sweetening medium from fruit which is further improved as respects the color of the sweetening medium filtrate and which is particularly adapted to the treatment of fruits having a tendency to form an unusual amount of color where increased to a relatively high pH.

Another object is to provide a method of preparing sweetening medium from fruit in which difficultly removable impurities are eliminated, and in which the treatment results in the formation of a granular and easily filterable and washable precipitate containing the undesired impurities together with added reagents and which, when separated, gives a filtrate which is improved as respects color.

A still further object is to provide an improved method for preparing sweetening medium from fruit, in which the maximum pH to which the composition is increased is reduced without a corresponding decrease in impurity elimination.

Other objects will appear hereinafter.

It has now been found that the foregoing objects are accomplished by a process in which a suitable acid is first added to ground fruit in sufficient quantity to materially reduce the pH of the liquid in the mixture, after which the pH is increased above 10 to a pH where a precipitate separates out and which is at the same time sufficiently high to result, upon subsequent addition of acid as described hereinafter, in the formation of a granular, easily filterable and washable precipitate containing substantially all the acids and ash forming materials in the mixture, including those added in the form of reagents.

After the pH has been increased above 10, as described, a suitable acid is added, preferably immediately after the reaction at the maximum pH is completed, in sufficient quantity to reduce the pH to a pH below about pH 9.2 at which the aforementioned granular, easily filterable and washable precipitate is obtained.

Usually the granular, easily filterable and washable precipitate containing the undesired impurities is obtained at a pH between about pH 9.2 and about pH 6.3, but in some instances it has been found desirable to continue the addition of acidic material down to a pH in the range from about pH 6.3 to about pH 5.3, or even lower to a pH in the range from about pH 5.3 to about pH 4. Preferably where the addition of acidic material is continued to about pH 6.3 or therebelow, more alkaline material is added thereafter, preferably after the reaction at such lower pH is complete. This addition of alkaline material may take place either before filtering or thereafter, as described subsequently herein. It is preferable that the alkaline material added at this point be the same alkaline material which has previously been added. The purpose of this addition of alkaline material is to produce a final filtrate having a pH between about 6.3 and about 8, and preferably substantially 7. Except as otherwise specifically set forth herein, the details of the procedure are substantially the same, whether the addition of acidic material is stopped between about pH 9.2 and about pH 6.3, the preferred range, or is carried to some lower pH. Accordingly the succeeding description which is concerned primarily with processes involving the preferred pH range, will be understood to apply generally to the process involving the lower ranges as well as to those involving the preferred ranges.

In carrying out this process, it has been found that the increase of the pH to such a high point does not result in any permanent or difficultly removable color in the resulting filtrate, provided the mixture is kept at a temperature which is not substantially elevated, that is, preferably below about 54° C., during the time when it has a pH in excess of about pH 9.2, that is, during at least the time when the latter part of the alkaline material is added, and thereafter until the pH has been reduced with acid to below about 9.2. The prompt addition of acid following the completion of the reaction at the maximum pH in accordance with the preferred procedure mentioned above, aids in avoiding a permanent or difficultly removable color in the filtrate, but it is important to allow sufficient time after the maximum pH is reached to insure that the reaction at this pH is complete before adding further quantities of acid.

Preferably, the mixture of ground fruit is kept below about 54° C., from the start of the process until the addition of both acid and alkaline material is complete. Upon completing this addition, however, it is preferable to heat the mixture to a temperature between about 54° C., and the boiling point to aid in completing the reaction and separating the precipitate. Following the heating step, the precipitate is then readily separated to leave a clear liquid by any desired filtering means. It has been found, however, that particularly good results are obtained if this separation is performed by an Oliver vacuum filter and preferably by a filter of this type which is precoated with a filter aid. The resulting clear liquid is a sweetening medium containing a very high proportion of the sugars originally present in the fruit. It is substantially free of acids and ash forming materials and has substantially the same sugar composition as that of the fruit from which it was obtained. If desired, it may be concentrated and/or decolorized with an active form of carbon, such as bone char, or activated carbon to provide a water white syrup, of any desired Brix concentration, or, if desired, the concentration may continue to the point where the sugars are obtained in crystalline form.

The present invention is applicable to the treatment of a wide variety of different kinds of fruit materials containing different amounts and different kinds of sugars and/or impurities such as whole fruits or fruit wastes or mixtures of different kinds of fruits, for example, a mixture of fruits in the proportion in which they are packed in a single pack or during a whole operating season. By way of illustration, if, during the operating season, the total pack should be 70% pears, 20% peaches and 10% grapes, the non-canning good portions of these fruits, which are normally wasted, could be blended in this ratio before processing. The invention is particularly applicable, however, to the treatment of fruits having a relatively high natural pH or a greater than average tendency to form difficultly removable color when increased to a high pH.

Because the present invention is adapted to the treatment of a wide variety of fruits, the properties of which vary considerably, it is not possible to give the exact pH above 10 to which a particular ground fruit material is preferably raised and it is similarly impossible to give the exact pH below about pH 9.2 at which such fruit material is preferably filtered following the addition of acid. This is true because the preferred treatment conditions for one batch of fruit may be quite different from those of another due to variation in the characteristics of the two batches. Such variations frequently occur not only between different kinds or mixtures of whole fruit or fruit wastes, but even between different lots of the same variety of fruit. The preferred maximum pH and the preferred pH at which to carry out the filtration are, however, readily determined in any given case by very simple tests and in view of the possibility of variations even between different lots of fruit of the same variety it is preferable to make a determination of the preferred maximum pH and preferred pH of filtration as described hereinafter on each batch of fruit treated.

The extent to which the pH of the ground fruit is reduced initially by adding acid may vary considerably within the scope of the invention. More particularly, the invention includes within its scope the addition initially of any quantity of acid sufficient to produce a substantial reduction in the pH. Excessive additions of acids initially may be made if desired but are not preferred because they do not produce any beneficial results and because of the cost of the acid, and on the other hand, too small additions may result in only a very slight improvement in the color of the filtrate. More particularly, it is generally not desirable to add a quantity of acid sufficient to reduce the pH of the initial fruit material much below about pH 2.5 and in accordance with the preferred procedure the quantity of acid added initially will be about that necessary to reduce the pH to about 3. Although the quantity of acid added initially is not usually predetermined by test, this quantity is taken into account in the test referred to above for determining the maximum pH and the pH at which to filter.

The preferred pH to which to increase the finely ground fruit material is determined by taking a small batch of the fruit material to be treated, grinding it to a fine pulp, adding to it sufficient acid to reduce the pH to that to which the main batch is to be reduced, for example pH 3, and then, while keeping the temperature below about 54° C., increasing the pH of the fruit by adding the divalent alkaline reagent. The addition may be relatively rapid until a pH of about 10 is reached, and it should then be continued slowly, preferably with constant agitation until a pH is reached at which a definite break occurs. Usually the mass will turn to a somewhat yellow color before this pH is reached. By a "definite break" is meant a break between solids and liquids, resulting in the settling of the solid material to leave a portion of clear liquid. As soon as this break occurs, the addition of alkaline material is interrupted.

When the break is reached a slight additional quantity of the reagent is preferably added in order to be sure that the entire mixture is carried through the pH at which the break occurs. A sufficient time (usually 10 to 20 minutes) is then allowed to permit the resulting reaction to proceed to completion. Preferably during this period the mixture is agitated continuously or at least frequently. When sufficient time has been allowed to permit the mixture to reach equilibrium, the pH is measured and recorded.

The acid reagent is then preferably added immediately with agitation to reduce the pH, the temperature still being kept below about 54° C. The addition of acid is preferably carried out slowly after the pH has been dropped below about 9.2. Below about 9.2 the pH is followed carefully as the acid is added and the pH beyond which further addition of acid down to pH 6.3 does not produce any further precipitate is noted. This is usually the optimum point at which to filter the mass. The addition of acid is preferably continued at least down to pH 7 in order to get the optimum point nearest neutrality.

Another batch of the fruit is then ground, acid is added to reduce the pH to pH 3, the alkaline reagent is added, as described above, in sufficient quantity to just carry the mixture through the pH at which the break occurs, the resulting mixture is agitated and allowed to reach equilibrium, then the acid reagent is added to reduce the pH to the predetermined optimum nearest neutrality, the temperature as before being maintained below about 54° C. until the addition of the acid reagent is completed. Thereafter, the mass is heated until a granular precipitate is formed. This may occur depending upon the type of fruit anywhere from about 54° C. to the boiling point. As soon as a granular precipitate is formed, however, it is preferable to discontinue the heating entirely and apply no further heat until after filtration as further heating beyond the point where a granular precipitate is formed tends to cause a sliming.

Following the heating, the mixture is then preferably tested on a Buchner funnel to determine the rate of filtration. Also the pH of the resulting filtrate is determined. This pH should be slightly lower than the pH to which the mixture was adjusted with acid prior to heating and if it is not, it is an indication that the alkaline reagent was not given sufficient time to react at the maximum pH before adding the acid reagent. Accordingly, where the pH of the filtrate is not lower than the pH prior to heating the test should be repeated as described above, allowing increased time for the reaction at the maximum pH. If, on the other hand, the rate of filtration is too slow for practical production purposes, a fresh sample of the fruit material is ground, acid is added to reduce the pH to 3 and sufficient of the alkaline reagent is then added to the acidified ground fruit mixture to increase its pH to a pH higher than the previously determined maximum, for example, to a pH about $\frac{1}{10}$ of a pH unit higher than the previously determined maximum pH. After agitating and allowing sufficient time for the reaction at this higher pH to go to completion, the pH is measured and noted and the acid reagent is then added to this further test portion with agitation in the manner described above until the pH has been gradually reduced at least to approximately neutrality or down to pH 6.3, noting the pH nearest neutrality beyond which further additions of acid do not cause any further precipitation, both additions being carried out below about 54° C. as described above.

Still another sample is then reduced to about pH 3, then increased to the new maximum, brought to equilibrium and then reduced to the pH determined on the preceding sample. This portion is maintained below about 54° C. until after the addition of the acid reagent and is then heated as described above and tested on a Buchner funnel and the pH of the filtrate is determined. If this pH is slightly lower than the pH prior to heating and if filtration now takes place at a satisfactory rate, the proper maximum pH and the proper pH to which to reduce the mixture following the increase to a maximum have now been determined for the whole batch of fruit. If filterability is still not satisfactory, or if the pH of the filtrate is not slightly lower than the pH prior to heating, the testing procedure is repeated, again increasing the pH to a maximum slightly higher than that of the preceding sample, and/or increasing the time allowed for reaction at the maximum pH, determining the pH to which a sample raised to the new maximum and/or actually brought to equilibrium at the maximum pH should thereafter be reduced and again testing for filterability and pH of the filtrate when employing these newly determined conditions.

The above description of the test for determining the pH to which to increase the fruit material and the pH to which to subsequently reduce it prior to filtration is concerned particularly with the more general and preferred procedure in which the filtration takes place at a pH between about 9.2 and about 6.3. As pointed out herein, however, it is occasionally necessary or desirable to filter at a pH even lower than 6.3, for example, as low as 5.3 or lower. It will be apparent to those skilled in the art, where satisfactory filtration is not obtained between pH 9.2 and pH 6.3, that the above test can be readily modified to determine the pH below 6.3 down to 5.3 or even lower at which satisfactory filtration is obtained resulting in separation of undesired impurities.

It will be apparent that the acid and alkaline materials employed in the test are preferably those to be used in treating the main batch and that, preferably, but not necessarily, exactly the same reagents are employed. The use of exactly the same reagents is particularly desirable in commercial operation, since it facilitates the addition of the reagents to the main batch of fruit material on a quantity basis rather than on a pH basis. Addition of reagents on a quantity basis obviously lends itself more readily to commercial operation and has been found to give the same results as addition on a pH basis when based on a test. To this end in carrying out the above described tests a measured sample of the fruit material is employed in each test and in addition to noting the pH to which the mixture should be increased with the alkaline reagent and the pH to which it should be reduced with the acid reagent, the quantities of these two reagents which are required to effect the pH adjustments are also noted. Then the main batch of the fruit material is measured and the appropriate quantities of reagents to produce the desired pH conditions therein can be readily calculated. Depending upon the nature of the particular batch of fruit material being treated, it has been found from about 1% to about 4% of $Ca(OH)_2$, by weight, based on the weight of the pulp is usually sufficient to increase the pH to the proper point. Thereafter from about 1½ gallons to about 6 gallons of a 75% by weight, aqueous solution of $H_3PO_4$ per ton of pulp is usually sufficient to reduce the mass to the proper pH at which to heat and filter.

It is stated above that the proper pH at which to heat and filter is that nearest neutrality beyond which further additions of acid reagent do not give any further precipitate and it is indicated that such proper pH may be above pH 8. It is generally desirable, however, to end up with a filtrate having a pH below 8. To this end in the relatively few instances where the filtrate has a pH above 8, when the mixture is heated and filtered at the proper pH determined by the test described above, it is preferable to heat and filter at a pH sufficiently below that determined by test to give a filtrate having a pH below 8 or else to acidify the filtrate itself to approximately neutrality and then filter again, if necessary. It has been found that addition of slightly more than the quantity of acid reagent required in accordance with the test data does not affect the results and is definitely beneficial where it gives a filtrate having a pH nearer to 7. Also the filtrate is improved where its pH is above 8, if sufficient acid reagent is added to reduce it below 8 and preferably to neutrality (pH 7), heating and filtering a second time if necessary. If the pH of the filtrate is below about 6.3, it is preferable to add a small quantity of alkaline reagent to bring the pH up to about pH 7 and heat and filter again. Where the pH of the filtrate lies between about 6.3 and 8, however, even though a pH near 7 is preferred, the filtrate is not ordinarily adjusted to a pH nearer neutrality, since any pH in this range is satisfactory for most purposes.

In accordance with the preferred procedure of the present invention, raw fruit such as peaches, pears, apples, grapes and the like, or dried fruit such as raisins and prunes, or the wastes from fruit packs such as the wastes from packing peaches or the waste from packing mixed fruit, known as fruit salad or fruit cocktail, or other fruit wastes or mixtures of two or more of the foregoing are ground to a fine pulp. This grinding of the fruit may be accomplished in any type of equipment adapted to grind or disintegrate fruit material, preferably without excessive emulsification or homogenization. A number of different types of equipment have been tried and found satisfactory, including an ordinary hammer mill with a fine screen, a rotating cutter type disintegrator, an American screw press (which is merely a tapered screw forcing the fruit particles through a fine screen) and a brush type pulper (which merely brushes the pulp through a screen). It will be apparent that in the machines involving the screen, the size and disintegration of the pulp is determined by the size of the holes in the screen. Among the various types of grinding or disintegrating machines tested, the brush type pulper is preferred since it separates or brushes the skins, stems, seeds, cores, et cetera, from the pulp and gives a purer initial pulp mass to treat, the skins, seeds, stems, cores, et cetera, being one of the principal sources of impurities.

The drying of certain fruits, such as prunes and raisins has a tendency, particularly when carried out over long periods with the aid of sun light, to form excessive quantities of difficultly removable impurities. The presence of the impurities to which reference is made frequently results in the formation of color at the high pH to which the fruit material is carried in accordance with the present invention, which color it is difficult or impossible to eliminate. It has been found, however, that these impurities may be largely eliminated by washing the dried fruits thoroughly in water prior to grinding them. The wash water is preferably hot, although not hot enough to scald the fruit. The impurities in question are largely on the surface of the fruit, and thus can be washed off. After washing the fruit is put into water which has been brought to a boil and sterilized over night. It will be understood, of course, that the application of heat to this sterilizing water is discontinued at or before the time the fruit is brought in contact therewith.

In general fruit material treated in accordance with the present invention in its natural state does not include sufficient water to insure the maximum extraction of the sweetening ingredients. In accordance with the preferred procedure, therefore, water in some form is added to the fruit material undergoing treatment at some point in the process prior to the filtration step. The water added may be relatively pure water or water containing materials which are not undesirable, particularly water derived from other points in the system such as, for example, the "sweet water" from washing the precipitate separated in the filtration step which is hereinafter more fully described.

The water content of the mixture undergoing treatment is preferably adjusted to about the amount which will insure the complete leaching out of the sugars or sweetening ingredients in the fruit. In general it has been found that with fruit material of normal water content the addition of about 10% of water by volume, based on the volume of the fruit material, is sufficient for this purpose. The amount of water used even with fruit material of normal water content may, however, be varied considerably from 10% within the scope of the invention depending upon the material treated as well as upon other considerations and in the case of fruits of abnormal water content, the amount preferably added varies widely. Thus, in the case of raisins, for example, the amount of water preferably added is of the order of 300%, by weight, of the raisins, although both greater and lesser quantities may be used.

It will be apparent, however, that the presence of excessively large quantities of water in any case increases the quantity of fruit material which must be handled and that on the other hand the presence of very small quantities of water may result in a pulp mixture which is too thick so that, for example, it does not heat readily, and in addition involves the danger that a substantial portion of the sugar will remain with the pulp and will not be extracted. Although water is generally added in accordance with the preferred procedure, its addition is not absolutely necessary. Furthermore, even in accordance with the preferred procedure the addition of water as such may be omitted in certain circumstances such as, for example, those where the fruit already contains large quantities of water and/or those where the alkaline reagent is added to the pulp in very dilute form so that the water added with the alkaline material brings the water content of the mixture up to the minimum required for maximum extraction of the sweetening ingredients.

The addition of the water preferably takes place in connection with the grinding or disintegration of the fruit, that is, either just prior to, during or immediately after the grinding. The advantage of adding the water prior to or during grinding is that it facilitates grinding and assists in avoiding air oxidation. As is well known, fruit exposed to air after the skin is broken rapidly oxidizes and turns brown, whereas if it is mixed with or covered with water this does not occur. There are, however, advantages connected with the addition of water even following the grinding which arise out of the increase in fluidity of the fruit material as a result of the addition of water. This increased fluidity not only facilitates pumping of the pulped fruit to a vessel in which it is to be treated for elimination of impurities, but also aids in bringing about a better distribution of added reagents and in avoiding local high concentrations of added reagents and gives a longer time for leaching out of sugars.

Proceeding with the description of the preferred procedure, the ground or disintegrated fruit material, preferably with its water content adjusted as above, if necessary, is next treated with an acid to reduce its pH to approximately pH 3, after which it is treated with alkaline material. If a test has not already been made to determine the maximum pH to which to increase the fruit material with alkaline material, it is made at this point, in the manner described in detail above, along with a determination of the pH to which the fruit material is thereafter reduced with an acid, preferably noting also the quantities of the acid and alkaline reagents required to bring about the appropriate adjustments of pH.

A suitable alkaline reagent is added to the fruit material to raise the pH of the fruit material to approximately the maximum determined by test, as described, the fruit material being maintained below about 54° C. during this addition. As indicated above, although the addition of the proper quantity of the alkaline reagent may be determined by actually measuring the pH of the fruit material, it is preferable to measure the quantity of fruit material and simply add the quantity of reagent indicated by test and calculation to give the proper maximum pH.

The acid material added initially to reduce the pH is also preferably added in measured quantity as determined by the test and is preferably the same acid which is to be added subsequent to the addition of alkaline material. Suitable acids are described hereinafter, but it will be understood that the pH may be reduced initially with any desired acid or acidic material which when added in sufficient quantity does not introduce undesirable radicals which cannot thereafter be satisfactorily eliminated. It will be understood that radicals which might be undesirable in large quantities may not be considered so if the quantity present is so small as to be negligible. Suitable alkaline materials with which to increase the pH are alkaline defecating agents, that is, alkaline materials which are eliminated from the mixture at a later stage of the process and which are also capable of precipitating undesired impurities. Divalent alkaline materials, and particularly the alkaline earth metal oxides and hydroxides, such as the oxides and hydroxides of barium, calcium, strontium and magnesium have been found to possess the desired properties. The preferred divalent alkaline material is lime, particularly hydrated lime having a purity of 90% or better and preferably a purity as high as 98% and which has a relatively low magnesium content (1½% or less), but other divalent alkaline materials both organic and inorganic may be used. Preferably also the divalent alkaline material should be finely ground in order to give more rapid distribution and reaction.

The acid reagent which is added initially to reduce the pH, and the alkaline reagent which is added thereafter, are both preferably dilute aqueous solutions or suspensions of the acid and alkaline materials respectively. The addition of the acid and alkaline materials in the form of dilute aqueous solutions or suspensions, particularly when accompanied by agitation of the mixture during and after the addition of the reagents in accordance with the preferred procedure aids in producing a homogeneous mixture and in avoiding local high concentrations of the reagent which are not desirable, particularly in the case of the alkaline material.

Following the addition of the alkaline reagent to the fruit material in sufficient quantity to increase the pH of the fruit material to the predetermined maximum the agitation is preferably continued until the resulting reaction is completed. The time required for the completion of the reaction varies somewhat as indicated above in describing the test, and it is preferable to allow from ten to twenty minutes or such other period as the test may indicate to be necessary, for the reaction to take place in order to be sure that it has proceeded to completion. After the completion of the reaction with the alkaline reagent the fruit material, still maintained at a temperature below about 54° C. is preferably acidified promptly with a suitable acid, as described above, in a quantity sufficient to reduce the pH to the pH, predetermined by test as described above, to be the pH beyond which further additions of acid do not produce any additional precipitate. In this case also the addition of the proper quantity of acid reagent may be determined by actually measuring the pH of the fruit material, but it is preferable to measure the quantity of fruit material and simply add the quantity of reagent indicated by test and calculation to give the proper pH. The acid reagent used is preferably a dilute aqueous solution of the acid and it is also preferable to agitate the mixture during and after the addition of the acid reagent. Agitation following the addition of the acid reagent is particularly desirable to aid in producing a homogeneous mixture and to aid in completing the reaction of the reagents.

The preferred acid with which to reduce the pH is phosphoric acid. While phosphoric acid is preferred because it gives consistently good results in eliminating impurities, aids in eliminating color, and does not give undesirable properties to the syrups such as bad taste, other acids may be used for part or all of the acidification but are not preferred because of their inferiority in one respect or another to phosphoric acid. Suitable acidic materials to use are acid defecating agents, that is any acid or combination of acids which when added in sufficient quantity under the pH conditions specified will form insoluble compounds with the alkaline material used and will displace sugars from compounds they form with said alkaline material without displacing undesired impurities from compounds they form with said alkaline material. Acids such as citric and sulfuric have been used where lime was the alkaline reagent, but neither of these gives as consistently good results as phosphoric acid.

Carbon dioxide or its corresponding acid, carbonic acid, is also capable of eliminating both the impurities and the alkaline material, but after the pH has decreased to 9.2 this acid dissolves lime to form bicarbonates. The bicarbonate may be eliminated, however, with the aid of compounds such as sodium carbonate or sodium aluminate, for example, by adding a small amount of such compound to the liquid filtrate and heating, preferably above 95° C. prior to treatment with an active form of carbon.

It is stated above that both the alkaline and acid reagents are preferably dilute aqueous solutions or suspensions. The concentrations of the dilute solutions or suspensions of lime and phosphoric acid are preferably of the order of 10 to 20%, by weight. Lime or phosphoric acid solutions or suspensions having lower or somewhat higher concentrations may be used if desired. With solutions or suspensions of higher concentrations, it is preferable to exercise care during the addition to avoid local high concentrations of the reagent. The use of lower concentrations of the order of 6% or considerably less, involves the handling of larger quantities of reagent, but it is advantageous in promoting better distribution of the reagent or where part of the water is to be supplied by the reagent solution.

Although the concentrations of the alkaline and acid reagents have been discussed together with particular reference to lime and phosphoric acid, it will be understood that in the treatment of any given batch of fruit material, it is by no means essential that the lime and phosphoric acid reagents be of the same or even approximately the same strength. It is likewise within the scope of the invention to employ acid reagents of different strengths for the initial reduction of the pH and for the reduction of the pH following the addition of alkaline material. Furthermore, the above discussion of concentration which particularly refers to lime and phosphoric acid, is intended to be representative with respect to other alkaline and acidic materials. Appropriate concentrations of other alkaline and other acidic materials will be readily apparent to those skilled in the art or can be readily determined by a simple test.

After the pH has been adjusted to the predetermined point by the addition of the acid reagent, sufficient time for reaction is preferably allowed and the mixture is then heated to a temperature between about 54° C. and the boiling point of the mixture to complete the reaction and bring about the precipitation of the maximum quantity of impurities in the form of a granular precipitate. As soon as this granular precipitate is formed it is preferable to discontinue the heating immediately and apply no further heat until after filtration because further heating tends to cause a sliming which will interfere with filtration.

The mixture is now ready to be filtered and as described above, this filtration may be accomplished in any of a wide variety of filtering devices, such as a filter press, a centrifuge, an Oliver type vacuum filter, either straight or precoated with a filter aid, or plain equipment. As set forth above, however, it has been found that particularly good results are obtained with the Oliver filter used, either as a straight vacuum filter or with a precoat. Preferably, where the precoat filter is not used, the resulting filtrate is run over a bag filter to take out any minor particles which may be carried through due to leaky filtering mediums. The resulting filtrate is a sweetening medium in the form of a clear syrup and with or without further treatment described hereinafter, as preferred, is ready for use. If desired a quantity of a filter aid may be added to the treated mixture prior to filtration in order to improve its filtering character.

Suitable filter aids include calcium carbonate, diatomaceous earth and bagasselio. Due to the fact that the present process yields a granular and easily filterable and washable precipitate, the addition of such filter aids is generally unnecessary and for some purposes, at least, is usually undesirable. Certain of the filter aids, for example, materially detract from the value of the separated solids when present therein.

The solid material separated by the above filtration is preferably washed to remove any small amount of sugar containing liquid or sweetening medium remaining therein. For this purpose ordinary water may be used or the pH of the water may be adjusted to approximately the pH of the filtrate, if desired, in order to avoid redissolving any precipitated impurities. The washing is preferably continued until the precipitate contains less than about 1% sugars, by weight. The wash water is also preferably passed through the bag filter, if one is used, in order to wash out any of the filtrate which may remain in this filter. The wash water or sweet water from washing the separated solids as described, may either be added to the main body of the filtrate or sweetening medium or may be returned into the system for use as a diluent. This is the wash water or sweet water referred to above as being suitable for use to supply additional water to the original fruit material in order to provide sufficient water to insure maximum extraction of the sweetening ingredients of the fruit. This sweet water may also be used instead of ordinary water as the diluent in making up the acid or alkaline reagent solutions or suspensions. It is generally preferable to return the sweet water into the system as a diluent, as described, since in this manner the sugar content thereof is not lost and at the same time the filtrate or sweetening medium is not diluted.

Where the filtration is conducted in accordance with the preferred procedure on an Oliver vacuum filter precoated with a filter aid, contrary to the above, it is preferable to include the wash water or sweet water in the filtrate. The Oliver filter is set so that sufficient time is allowed to permit the completion of the filtration of the material which is picked up on the surface of the filter aid, and also to permit washing of this filtered material before the scraper knife is reached. Sprays of wash water are positioned to spray wash water onto the solids after their filtration is substantially complete, this wash water then passing into the interior of the drum along with the filtrate.

In accordance with the preferred procedure the wash water is supplied at an elevated temperature between about 54° C. and the boiling point. Preferably this wash water will have substantially the same temperature when it strikes the solids on the surface of the drum, as the mixture undergoing filtration has. It has been found, in general, that about 5% by volume of wash water based on the volume of filtrate is entirely adequate to reduce the sugar content of the filtered solids to about 1% or less.

The fruit material from which the sweetening media are prepared contains materials which give it a characteristic flavor and taste and usually a color and in addition coloring materials are usually formed to a greater or less extent during the purification treatment. The materials imparting color, odor and flavor, particularly the latter two, are not objectionable for certain purposes, for example where a sweetening medium is to be used in fruit of the same type from which it is derived. The removal of these materials is not essential, therefore, although it is preferred.

Some materials of this type, particularly those imparting color, are usually present in the clear filtrate from the filtration step described above. Preferably, therefore, this clear filtrate is treated with an active form of carbon such as animal bone char or activated carbon whereby any coloring material and any materials imparting odor and flavor which may still be present are removed. The clear filtrate is ordinarily substantially neutral since the pH at which filtration takes place is preferably as near neutrality as possible, although the pH of the clear filtrate may not be exactly 7.

The Oliver vacuum filter may also be used very conveniently in the decolorizing of the filtrate with an active form of carbon. For this purpose only a very thin layer of precoat material or filter aid is applied and then, in the same manner that the precoat material is applied, a layer of finely divided active carbon, such as a layer of bone char or activated carbon is built up on the filter drum on top of the thin layer of precoat material. This layer of active carbon is generally from ¼ to 1 inch in thickness, depending on the precoat material, and may be as thick as 2 inches or more. It is preferably built up to as thick a layer as possible which will not break off in operation of the filter. Active carbon is also added to the filtrate to be decolorized in the usual manner and intimately mixed therewith, but a considerably smaller quantity may be used, due to the layer on the filter. The filtrate treated with active carbon is then supplied to the Oliver vacuum filter and filtered through the layer of active carbon. During each revolution of the drum, a small additional quantity of carbon is deposited by the material being filtered and the scraping knife on the filter is set at a fixed position where it will just shave this added material off, maintaining the layer of the carbon on the filter drum substantially uniformly at its initial thickness. As described above wash water is sprayed onto the surface of the drum to sweeten off or wash out the sugars in the layer of active carbon. The foregoing provides a very convenient and efficient method for removing the treating carbon and is particularly advantageous from the standpoint of washing or sweetening off the carbon.

The clear filtrate or sweetening medium may be concentrated to any desired extent, but concentration preferably, but not necessarily, follows the treatment with bone char or carbon. Usually concentration is not carried far enough to crystallize out any sugars, since the syrup form of the sweetening medium is entirely satisfactory for most purposes and in fact is preferable. If a slightly caramelized color appears after concentration, the medium can be again decolorized over the bone char or activated carbon. Concentration is carried out in a conventional manner by evaporation accelerated by the use of heat. If desired, it may be continued to the point where the sugars are deposited out of the solution in crystalline form, although this is not usually done as indicated above. For example, in making a sweetening medium for a fruit pack, concentration may be omitted entirely or may be stopped after it has progressed to the point where a moderately thick syrup has been formed which is suitable for the packing of fruit.

Although it is generally unnecessary, the purity of the sweetening media may be further increased in some cases, if desired, by treatment with ion exchange bodies. As examples of such materials mention is made of base exchange bodies, such as zeolites, permutit and amines.

The pulp and the material precipitated during treatment which are left behind when the sweetening medium is separated as, for example, by filtration, are valuable and can be dried and used for various purposes, preferably after washing as described above. For example, this material is suitable for use as a fertilizer.

It is, of course, preferable to add to any batch of fruit just the quantities of reagents required to give the optimum pH's predetermined by test as described above. The invention is not, however, intended to be limited strictly to the use of the optimum conditions. Moderate variations from the optimum points do not greatly affect the results and such moderate variations are, therefore, within the scope of the invention.

To further facilitate understanding of the improved method of preparing sweetening media from fruit which is disclosed herein, the following detailed example is given. This example is merely illustrative and is not intended to be construed as limiting the scope of the invention.

*Example I*

Nineteen hundred pounds of pears were pulverized through a brush separator. Thirty percent by volume of water was then added to the pulverized fruit in order to provide sufficient water to insure maximum extraction of the sweetening ingredients (this quantity of water was found to be excessive, although operable; about 10% by volume would have been adequate). The pH of the diluted ground mass of pears was 4.9. A 10° Brix aqueous phosphoric acid solution was then added to the mass in a tank provided with an agitator and with means for heating the tank. The addition of the acid was accompanied and followed by agitation to provide thorough mixing and was continued until the pH of the mass was reduced to 3.

Lime in the form of a 10° Brix aqueous solution was next added to the mixture. The addition of the lime reagent was also accompanied by agitation and was continued until the pH of the mixture was increased to pH 11.3 indicated by previous test, as described above, to be the proper pH above 10 to which to increase the pH of the mixture with lime, and agitation was continued thereafter until the lime was thoroughly distributed and the resulting action completed. About fifteen minutes was allowed for this purpose, after the lime had all been added.

When the reaction resulting upon the addition and thorough distribution of the lime was complete, the pH of the mixture was then reduced to pH 7.8 by adding phosphoric acid in the form of a 10° Brix aqueous solution, the mixture being agitated during the addition of the acid to insure its thorough distribution. Following the grinding and addition of water as described above care was taken to see that the temperature of the mixture was at all times maintained below about 54° C. When the addition and thorough distribution of the acid was completed, however, the entire mass was then heated to boiling to complete the reaction.

A granular precipitate resulted and the solids were then readily separated by running the mass over an Oliver type precoated vacuum filter to leave a clear filtrate. The separated solids were washed with water until the solids contained less than 1% sugars and these washings were added to the clear filtrate. The washed solids were removed and dried for disposition as fertilizer or for other purposes. The clear filtrate, together with the washings, was decolorized over bone char in the conventional manner to provide a sweetening medium in the form of a clear, substantially water white syrup, which could be further concentrated or used as such.

The 1900 pounds of pears originally contained 228 pounds of total sugars. Analysis of a sample of the original juice showed a sugars purity of 73%. The final syrup product totalled 490 gallons and was found on analysis to contain 193 pounds of total sugars, or, in other words, of the 228 pounds of sugar in the original fruit material 193 pounds were recovered in the final syrup product. This represents a yield of 84% and indicates that the efficiency of the extraction is very good. In addition the sugars purity of the final product was substantially improved, being 76%. The pH of the final syrup product was 7. The precipitate filtered off contained ½ of 1% total sugars, accounting for at least a portion of that not recovered.

The process described and illustrated above eliminates from the fruit those materials originally present or added as reagents which when present detract from the sweetening power of the sugars. The final product is thus a sweetening medium. The principal materials which detract from the sweetening power of the sugars in fruit compositions are the acids and bitter salts, particularly the organic acids, and these are substantially eliminated by the process described. There are, of course, other water-soluble non-sugars present in the original fruit material and a substantial portion of these is carried over into the final sweetening medium product, as evidenced by the fact that the sugars purity of the product is not usually one hundred percent when the medium is finished off in syrup form. These non-sugars which remain cannot really be regarded as impurities because they are inert and do not have any adverse effect on the sweetening power of the sugars present. Furthermore, they are constituents of the fruit from which the sweetening medium is derived, and where the latter is to be added to fruit these non-sugars are the same as materials already present in the fruit. Some inert non-sugars may be eliminated during purification but such elimination is generally incidental to the main purpose.

The term "sweetening medium" is used repeatedly herein, and in the light of the foregoing explanation it will be understood that it means just what the name signifies, i. e., a sugar containing medium which is substantially free of materials which detract from the sweetening power of the sugars present, such as acids and ash-forming materials, although it may contain substantial quantities of inert diluents.

"Sugars purity," as used herein, is expressed in terms of the quantity of sugars as related to the total solid materials in solution with the sugars in a common solvent.

The advantages of the present invention will be apparent from the foregoing description in large part. One of the chief merits of the process is that it is simple and inexpensive to carry out and is thus very practical from the economic standpoint. An outstanding advantage of the process described herein is that the precipitate formed is granular and easily filterable and washable and contains all the undesirable impurities. The foregoing improvements in filterability and washability of the precipitate with resulting saving in time and equipment is accomplished, moreover, without any substantial decrease in the purity of the final product or material decrease in yield. It is an outstanding advantage of the present process that filtrates of improved color (having less color than filtrates obtained from previously known processes) are obtained along with the other desirable results set forth above, and that the color of the filtrate is good even where the starting material contains unusual quantities of impurities which tend to form color at a high pH and is so good in many cases that further treatment of the initial filtrate to remove color is unnecessary. The percentage of sugar recovered from the fruit material in a useful form is exceedingly high, very little sugar being left behind in the filter cake or destroyed in the purification operations.

It is apparent that many widely different embodiments of this invention may be made without departing from the spirit and scope thereof, and, therefore, it is not intended to be limited except as indicated in the appended claims.

We claim:
1. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount sufficient to materially reduce the pH of the fruit composition and to produce an improved color in the clear liquid obtained as hereinafter set forth, then adding an alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete, adding an acid defecating agent in an amount sufficient to reduce the pH to a pH below about pH 9.2 at which said granular, readily filterable and washable precipitate is formed, and thereafter separating the precipitate so formed to leave a clear liquid, said composition being maintained at a temperature below about 54° C. at least during the time when it has a pH above about 9.2.

2. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount sufficient to materially reduce the pH of the fruit composition and to produce an improved color in the clear liquid obtained as hereinafter set forth, then adding an alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete, adding an acid defecating agent in an amount sufficient to reduce the pH to a pH between about pH 9.2 and pH 6.3 at which said granular, readily filterable and washable precipitate is formed, and thereafter separating the precipitate so formed to leave a clear liquid, said composition being maintained at a temperature below about 54° C. at least during the time when it has a pH above about 9.2.

3. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount sufficient to materially reduce the pH of the fruit composition and to produce an improved color in the clear liquid obtained as hereinafter set forth, and being capable of forming an insoluble compound with the alkaline material to be added subsequently, then adding a divalent alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete, adding an acid defecating agent in an amount sufficient to reduce the pH of the composition to a pH below about pH 9.2 at which said granular, readily filterable and washable precipitate is formed, and thereafter separating the precipitate so formed to leave a clear liquid, said composition being maintained at a temperature below about 54° C., at least during the time when it has a pH above about 9.2.

4. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount sufficient to materially reduce the pH of the fruit composition and to produce an improved color in the clear liquid obtained as hereinafter set forth and being capable of forming an insoluble compound with the alkaline material to be added subsequently, then adding a divalent alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete adding phosphoric acid in an amount sufficient to reduce the pH of the composition to a pH below about pH 9.2 at which said granular, readily filterable and washable precipitate is formed, and thereafter separating the precipitate so formed to leave a clear liquid, said composition being maintained at a temperature below about 54° C., at least during the time when it has a pH above about 9.2.

5. In the process of preparing a sweetening medium from fruit, the steps which comprise adding phosphoric acid to a composition obtained by grinding fruit material and comprising the sweetening ingredients of the fruit together with acids and ash-forming materials of the fruit, said phosphoric acid being added in an amount at least sufficient to reduce the pH of the fruit composition to 3, then adding lime in an amount sufficient to increase the pH of the fruit composition to substantially the pH above 10 at which a break occurs and which results in the formation subsequently of a granular, readily filterable and washable precipitate, then when the reaction at this pH is complete adding phosphoric acid in an amount sufficient to reduce the pH of the composition to a pH below about 9.2 at which said granular, readily filterable and washable precipitate is formed, then heating the composition to a temperature between about 54° C., and the boiling point of the mixture to complete the formation of the precipitate and thereafter separating the precipitate so formed to leave a clear liquid, said composition being maintained at a temperature below about 54° C., until the addition of phosphoric acid is complete.

6. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount at least sufficient to reduce the pH of the fruit composition to 3, then adding an alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete, adding a defecating agent in an amount sufficient to reduce the pH of the composition to a pH between about pH 9.2 and about pH 6.3 at which said granular, readily filterable and washable precipitate is formed, and thereafter separating the precipitate so formed to leave a clear liquid, said composition being maintained at a temperature below about 54° C., at least during the time when it has a pH above about 9.2.

7. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount at least sufficient to reduce the pH of the fruit composition to 3, then adding an alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete adding an acid defecating agent in an amount sufficient to reduce the pH of the composition to a pH between about pH 9.2 and about pH 6.3 below which further addition of said acid defecating agent does not form any additional precipitate, and thereafter separating the precipitate so formed to leave a clear liquid, said composition being maintained at a temperature below about 54° C. at least during the time when it has a pH above about 9.2.

8. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount sufficient to materially reduce the pH of the fruit composition and to produce an improved color in the clear liquid obtained as hereinafter set forth, then adding a divalent alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete adding an acid defecating agent in an amount sufficient to reduce the pH of the composition to a pH between about pH 9.2 and about pH 6.3 at which said granular, readily filterable and washable precipitate is formed, and thereafter separating the precipitate so formed to leave a clear liquid, said composition being maintained at a temperature below about 54° C., at least during the time when it has a pH above about 9.2.

9. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount sufficient to materially reduce the pH of the fruit composition and to produce an improved color in the clear liquid obtained as hereinafter set forth, then adding a divalent alkaline defecating agent in an amount sufficient to increase the pH of the fruit composition to substantially the pH above 10 at which a break occurs and which results in the formation subsequently of a granular, readily filterable and washable precipitate, then when the reaction at this pH is complete adding phosphoric acid in an amount sufficient to reduce the pH of the composition to a pH between about pH 9.2 and about pH 6.3 at which said granular, readily filterable and washable precipitate is formed, heating the composition to a temperature between about 54° C. and the boiling point of the mixture to complete the formation of the precipitate, and thereafter separating the precipitate so formed to leave a clear liquid, said composition being maintained at a temperature below about 54° C. until the addition of said alkaline material and said acidic material is complete.

10. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount sufficient to materially reduce the pH of the fruit composition and to produce an improved color in the clear liquid obtained as hereinafter set forth, then adding lime in an amount sufficient to increase the pH of the fruit composition to substantially the pH above 10 at which a break occurs and which results in the formation subsequently of a granular readily filterable and washable precipitate, then, when the reaction at this pH is complete adding phosphoric acid in an amount sufficient to reduce the pH of the composition to a pH between about pH 9.2 and about pH 6.3 at which said granular, readily filterable and washable precipitate is formed, and thereafter separating the precipitate so formed to leave a clear liquid, said composition being maintained at a temperature below about 54° C., at least during the time when it has a pH above about 9.2.

11. In the process of preparing a sweetening medium from fruit, the steps which comprise adding an acidic material to a composition obtained by grinding fruit material and comprising the sweetening ingredients of the fruit together with acids and ash-forming materials of the fruit, said acidic material being added in an amount at least sufficient to reduce the pH of the fruit composition to 3, then adding lime in an amount sufficient to increase the pH of the fruit composition to substantially the pH above 10 at which a break occurs and which results in the formation subsequently of a granular, readily filterable and washable precipitate, then, when the reaction at this pH is complete, adding phosphoric acid in an amount sufficient to reduce the pH of the composition to a pH between about pH 9.2 and about pH 6.3 at which said granular, readily filterable and washable precipitate is formed, heating the composition to a temperature between about 54° C. and the boiling point of the mixture to complete the formation of the precipitate, and thereafter separating the precipitate so formed to leave a clear liquid, said composition being maintained at a temperature below about 54° C., at least during the time when it has a pH above about 9.2.

12. In the process of preparing a sweetening medium from fruit the steps which comprise adding an acidic material to a composition obtained by grinding fruit material and comprising the sweetening ingredients of the fruit together with acids and ash-forming materials of the fruit, said acidic material being added in an amount sufficient to reduce the pH of the fruit composition to a pH in the range between about pH 2.5 and about pH 3, then adding lime in an amount sufficient to increase the pH of the fruit composition to substantially the pH above 10 at which a break occurs and which results in the formation subsequently of a granular, readily filterable and washable precipitate, then when the reaction at this pH is complete, adding phosphoric acid in an amount sufficient to reduce the pH of the composition substantially to a pH between about pH 9.2 and about pH 6.3, below which further additions of phosphoric acid do not produce any additional precipitate, heating the composition to a temperature between about 54° C. and the boiling point of the mixture to complete the formation of the precipitate, and thereafter separating the precipitate so formed to leave a clear liquid, said composition being maintained at a temperature below about 54° C., at least during the time when it has a pH above about 9.2.

13. The process of preparing a sweetening medium from fruit which comprises adding dilute aqueous phosphoric acid to fruit in the form of a finely ground pulp from which at least the skins, seeds, stems and cores have been separated and which contains sufficient water to insure maximum extraction of the sweetening ingredients, said phosphoric acid being added in an amount sufficient to reduce the pH of the fruit composition to about pH 3, then adding dilute aqueous lime in an amount predetermined by test to be sufficient to increase the pH of the fruit composition to substantially the pH above 10 at which a break occurs and which results in the formation subsequently of a granular, readily filterable and washable precipitate, then when the reaction at this pH is complete adding dilute aqueous phosphoric acid in an amount sufficient to reduce the pH of the composition to a pH between about pH 9.2 and about pH 6.3, below which further additions of said phosphoric acid do not produce any additional precipitate, heating the composition to a temperature between about 54° C. and the boiling point of the mixture to complete the formation of the precipitate, and thereafter separating the precipitate so formed to leave a clear liquid, said composition being maintained at a temperature below about 54° C., until the addition of said lime and phosphoric acid is completed.

ARVID M. ERICKSON.
JOHN D. RYAN.